United States Patent [19]
Warner

[11] Patent Number: 5,445,279
[45] Date of Patent: Aug. 29, 1995

[54] FOLDABLE AUTOMOBILE HARDTOP ROOF STORAGE CART

[75] Inventor: Thomas R. Warner, Troy, Mich.

[73] Assignee: Advanced Thermoforming, Inc., Sterling Heights, Mich.

[21] Appl. No.: 122,687

[22] Filed: Sep. 17, 1993

[51] Int. Cl.$^6$ ............................................. A47G 7/00
[52] U.S. Cl. ....................................... 211/195; 248/456
[58] Field of Search ............... 211/195, 104, 132; 280/79.3; 248/165, 456

[56] References Cited

U.S. PATENT DOCUMENTS

| | | | |
|---|---|---|---|
| D. 288,736 | 3/1987 | Cornich . | |
| D. 324,597 | 3/1992 | Zeidler . | |
| 2,147,347 | 2/1939 | Jury | 248/456 |
| 2,219,091 | 10/1940 | Henderson | 248/456 X |
| 2,583,097 | 1/1952 | Heimann | 248/456 |
| 2,691,238 | 10/1954 | Svatos | 248/456 |
| 4,326,726 | 4/1982 | Dunchock . | |
| 4,618,119 | 10/1986 | Powell | 248/456 |
| 4,867,465 | 9/1989 | Dunchock . | |

*Primary Examiner*—Ramon O. Ramirez
*Assistant Examiner*—Sarah L. Purol
*Attorney, Agent, or Firm*—Howard & Howard

[57] ABSTRACT

A portable storage cart is needed for storing an automobile rooftop that is removable from the vehicle. The foldable storage cart of this invention securely and conveniently transports and stores a vehicle rooftop when it is not on the vehicle. The foldable storage cart includes a base and two generally planar support panels. The base and support panels form a triangle in an upright supporting position. A rooftop is received and supported on a portion of the base and one of the support panels. At least one of the support panels is hingedly connected to the base such that the storage cart folds into an essentially flat position where the second support panel can be nested between the base and the first support panel. In the folded storable position, the storage cart is easily stored out of a user's way while the rooftop is placed on the vehicle.

27 Claims, 3 Drawing Sheets

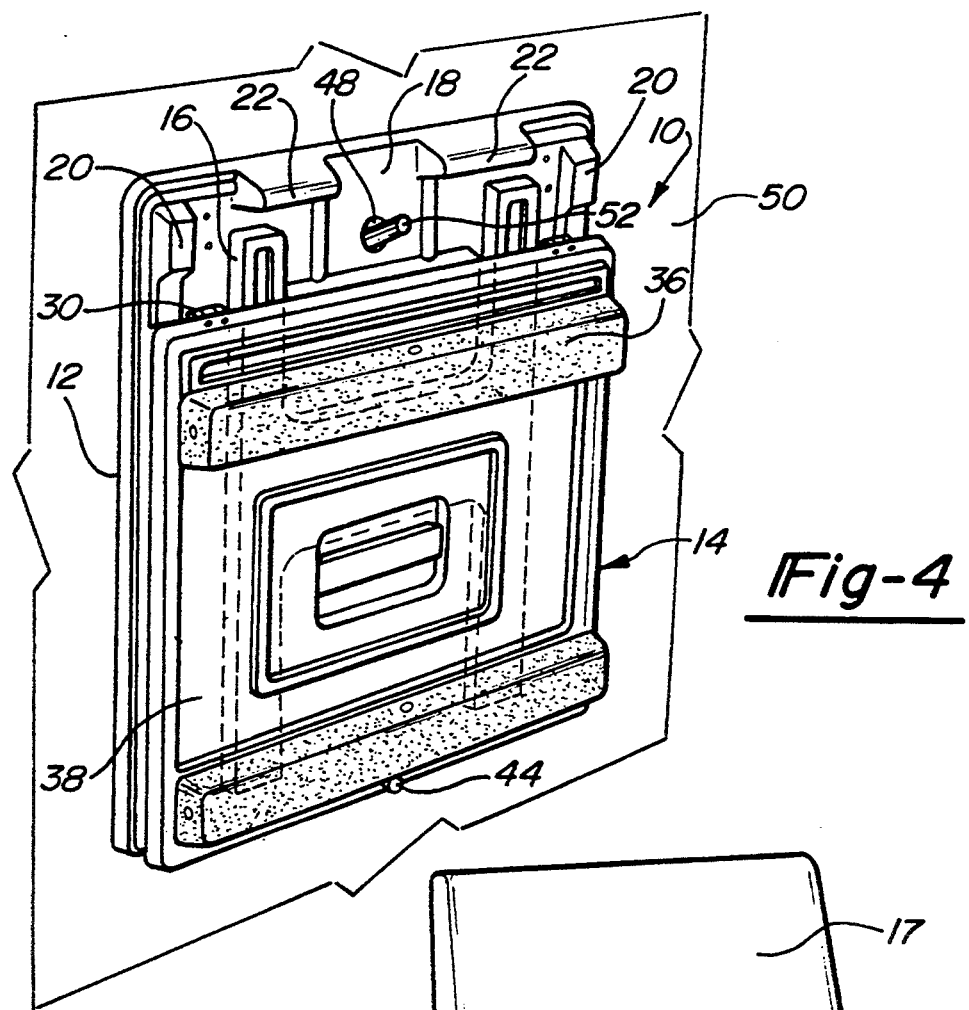
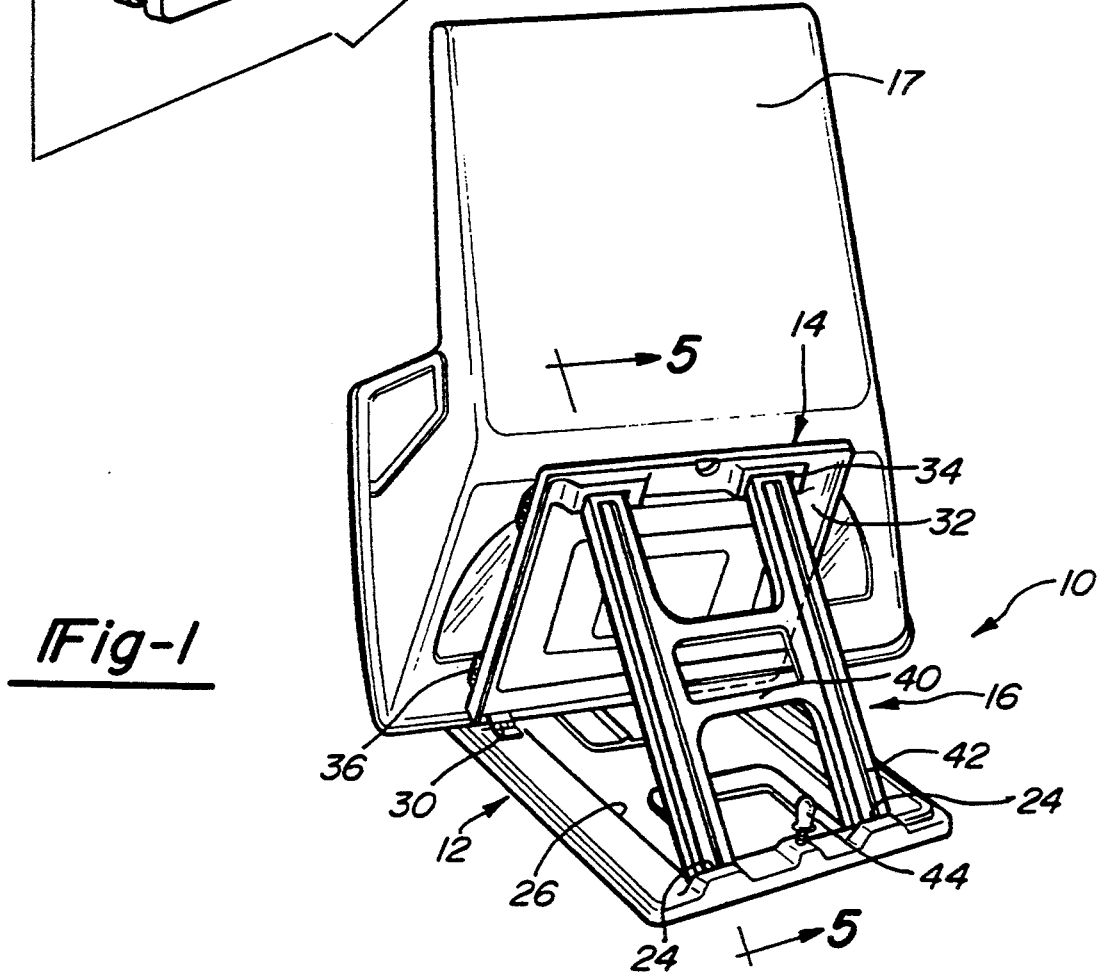

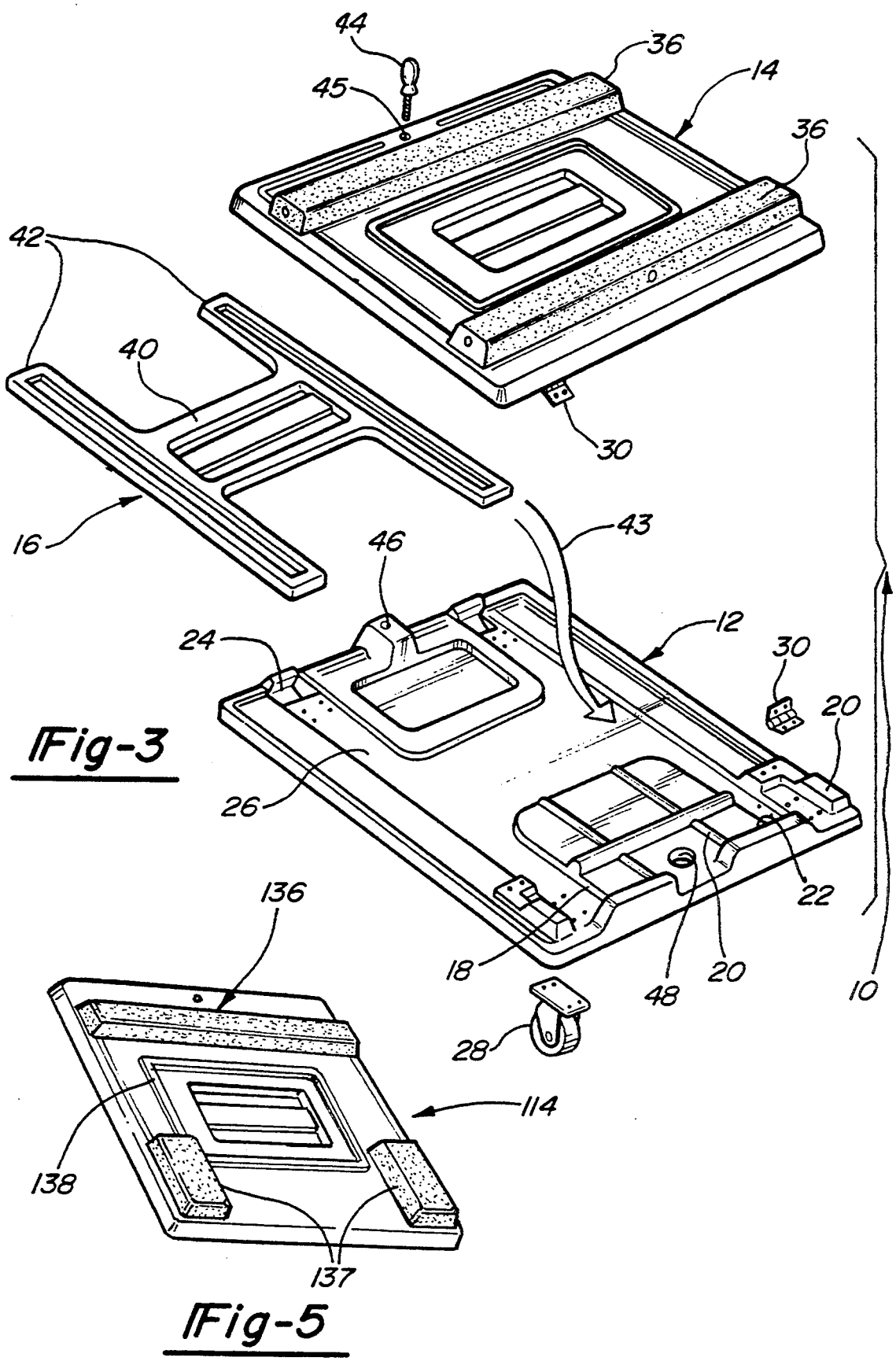

FOLDABLE AUTOMOBILE HARDTOP ROOF STORAGE CART

BACKGROUND OF THE INVENTION

This invention generally relates to a portable storage cart. More specifically, this invention relates to an improved wheeled carrier for a removable automobile hardtop for moving the hardtop or placing it in storage.

Some vehicles include removable rooftops or "hardtops." Such vehicles are commonly known are hardtop convertibles. The premise behind a hardtop convertible is typically that the roof of the vehicle is removeable including that portion of the roof extending back from the windshield generally including the rear window. Hardtop convertibles provide a driver with the luxury of an open convertible on a warm, sunny day with the warmth and security of a hardtop. Perhaps the biggest drawback to owning a hardtop convertible is determining what to do with the rooftop when it is not on the vehicle.

When a hardtop roof is removed from a vehicle, it must be moved and stored. Such hardtops are typically heavy and inherently bulky and awkward to handle. Therefore, hardtop roofs are difficult to maneuver and store. Further, the paint and rear window on a hardtop roof can be easily scratched and damaged when moved or while the hardtop is in storage. Therefore, a proper and convenient means for moving and securely storing a hardtop roof is needed.

A variety of available rooftop storage racks attempt to provide a means for storing such hardtops. Such convertible hardtop storage racks are rigid in construction and must be assembled before use. Thus, the rack itself cannot be easily stored when not in use. The most common type of storage rack has an open triangular frame construction which may include flocking on the upwardly angled support members. As will be understood, the open frame construction does not protect the hardtop from undesirable contact during moving and storage. The hardtop is generally wheeled through and stored in the owner's garage where the hardtop may be damaged by contact with the items normally stored in a garage. The flocking material used to prevent damage to the rooftop wears off and the narrow inclined support members may scratch and mar the rooftop. The racks are also difficult to assemble and disassemble, when not in use. Examples of open frame storage racks are shown in U.S. Pats. Nos. 4,326,726, 4,867,465 and Des. 288,736.

The closed frame design disclosed in U.S. Pat. Des. No. 324,597 provides better protection for the convertible hardtop, but this design is relatively expensive, time consuming to assemble and disassemble and is bulky and awkward to store, when not in use. Thus, the prior art fails to disclose a hardtop convertible storage rack which protects the rooftop during movement and storage, which is relatively inexpensive and easily stored. The automotive rooftop storage rack of this invention is foldable for easy storage, simple in construction and protects the rooftop when in use.

SUMMARY OF THE INVENTION

The convertible hardtop foldable storage cart of this invention includes a base and a plurality of wheels attached to the base for easily transporting the cart and rooftop to a convenient storage location. A first generally planar support panel is hingedly connected to the base near a lower edge on the first support panel. Further, a second generally planar support panel engages an abutment on an inward surface of the first support panel that generally faces the base and another abutment along a rear edge of the base.

In an upright supporting position, the storage cart of this invention effectively forms an upright triangle for supporting a vehicle rooftop. The second support panel abuts the inward surface of the first support panel and a portion of the base, such that the first support panel is inclined upright relative to the base. In this position the cart is able to securely support and protect a rooftop on a portion of the base and the first support panel. The lower rearmost edge of the rooftop is placed on the base near the point where the first support panel is connected to the base, such that the front edge of the rooftop is generally vertical and essentially perpendicular to the ground. In the preferred embodiment of this invention, the first support panel includes a pair of cradles which engage the rearmost wall or window of the rooftop. The cradle assemblies are preferably plastic coated or vinyl wrapped so that the window or rear wall of the rooftop is not scratched or marred while on the cart.

The preferred embodiment of the foldable storage cart includes a base having a pair of abutments or stops along a front edge of the base near to and laterally opposite the lower edge of the hingedly connected support panel. These stops prevent a rooftop from moving laterally relative to the base when placed on the cart. The preferred embodiment of the storage cart of this invention further includes a series of ribs along the portion of the base that supports the lower rearmost edge of the rooftop. These ribs provide more secure means of storing the rooftop, while adding strength and rigidity to the cart.

In a folded nonsupporting position, the inventive storage cart is essentially flat and easily stored. In the most preferred embodiment of the foldable cart, the first support panel is hingedly connected to the base and second support panel is generally H or Y-shaped. The support panel is removable from its abutting supporting position. The preferred embodiment further includes a recess on the base adapted to receive the H or Y-shaped support panel when it is laid flat upon the base for storing the cart. The cart also preferably includes a latching mechanism for temporarily securing the nonhinged edge of the first support panel against the base, while the H or Y-shaped support member is nested within the configured recess on the base between the base and the first support panel. The preferred embodiment of this invention further includes a hole or notch on a portion of the base for hanging or storing the folded storage cart.

These and other features and objects of this invention will become apparent to one skilled in the art from the following detailed description of the preferred embodiments. A preferred embodiment of the rooftop storage cart of this invention will be described in conjunction with the appended drawings, of which the following is a brief description.

BRIEF DESCRIPTION OF THE DRAWINGS

FIG. 1 is a rear perspective view of a preferred embodiment of a foldable storage cart of this invention supporting a vehicle rooftop;

FIG. 3 an exploded perspective view of a disassembled storage cart, illustrating the various components of the storage cart of FIG. 1;

FIG. 4 perspective view of the foldable storage cart shown in FIG. 1 in a folded storage position, as it would be conveniently hung upon a wall; and FIG. 5 is a side perspective view of an alternative embodiment of a support panel in an upright position.

DESCRIPTION OF THE PREFERRED EMBODIMENTS OF THIS INVENTION

Figure 2:
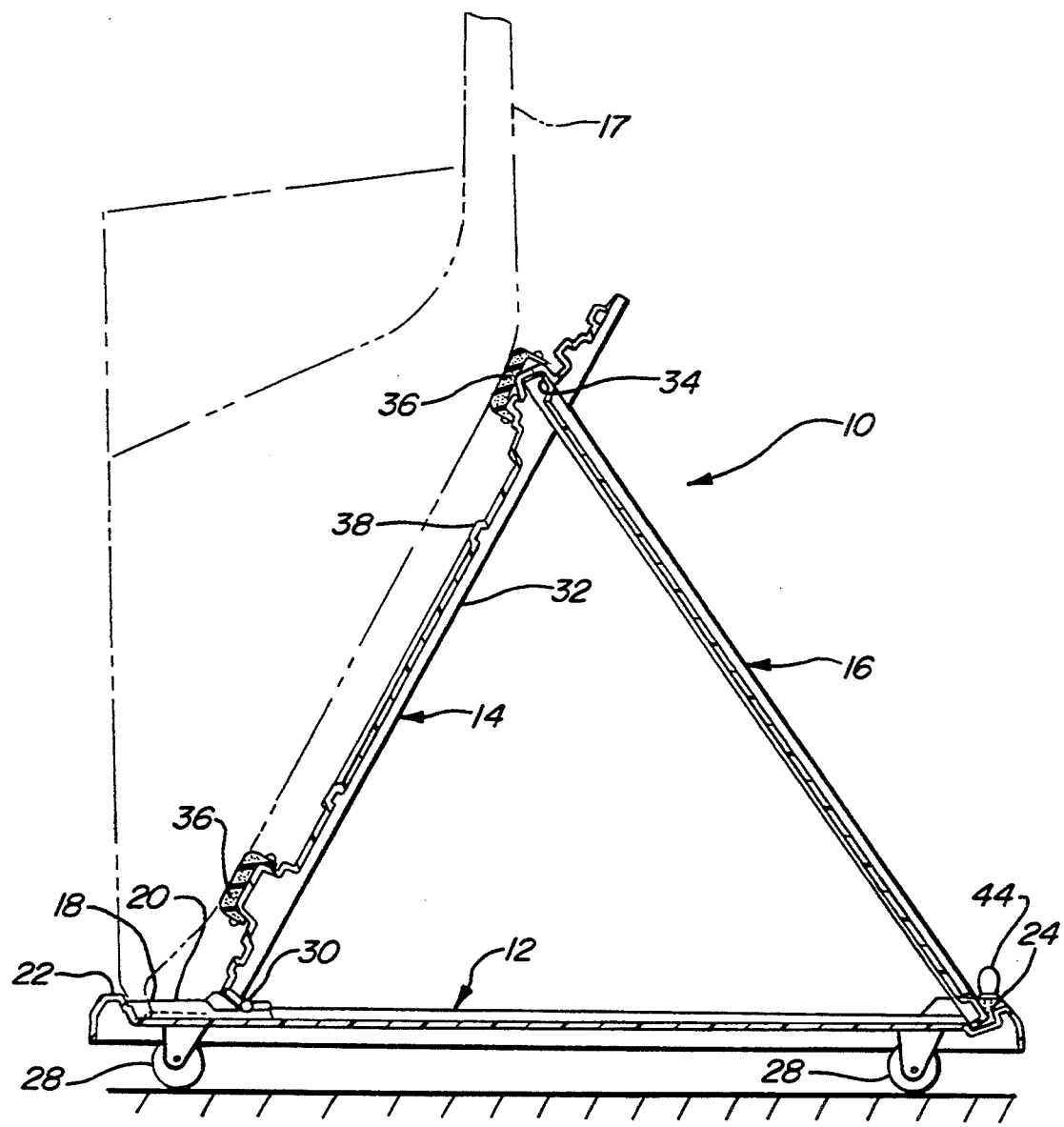
FIG. 2 is a partial cross-sectional view of the foldable storage cart shown in FIG. 1 with the rooftop shown in phantom as viewed from the side in FIG. 1.

FIG. 1 illustrates, in perspective, a preferred embodiment of a foldable storage cart 10 of this invention in a hardtop supporting position, including a base 12, a first support panel 14 and a second support panel 16. Storage cart 10 is shown supporting an automotive rooftop 17 in a generally vertical orientation.

FIG. 2 is a partial cross-sectional view of the storage cart 10 with the rooftop 17 shown in phantom as it would be seen in FIG. 1 along the line indicated by directional arrows 5—5. The lower rearmost edge of rooftop 17 is supported on load support portion 18 of base 12. Load support portion 18 preferably includes ribs 20. In the preferred embodiment, ribs 20 supportingly conform to the lower rearmost portion of rooftop 17. Abutments or stops 22 are included near a front edge of base 12. Stops 22 prevent rooftop 17 from moving laterally relative to base 12 when rooftop 17 is appropriately supported on storage cart 10. The position of foldable storage cart 10 illustrated in FIGS. 1 and 2 is referred to herein as the upright supporting position.

Base 12 further includes an abutment or notch 24 near a rear edge of the base. Notch 24 abutingly engages a portion of support panel 16 when storage cart 10 is in the upright supporting position. In the preferred embodiment, base 12 further includes recess 26 (see FIG. 1) appropriately shaped and adapted to receive support panel 16 when storage cart 10 is placed in a folded storable position, as described below. Base 12 also preferably includes wheels 28 (see FIG. 2) connected to the bottom surface of base 12. In the preferred embodiment, wheels 28 are casters allowing the foldable storage cart 10 and an appropriately placed vehicle rooftop 17 to be easily transported to a convenient storage location.

Support panel 14 is preferably hingedly connected to base 12 by conventional piano-type hinges 30 (see FIG. 3), such that an inward surface 32 on support panel 14 generally faces base 12. Support panel 14 includes an abutment or notch 34 (see FIGS. 1 and 2) on the inward surface 32. In the preferred embodiment, notch 34 is spaced from the edge of support panel 14 that is distal from base 12. When the storage cart 10 is in the upright support position, notch 34 abutingly engages one edge of support panel 16. Support panel 14 further includes two horizontally oriented cradles or support pads 36 (see FIGS. 2 and 3) that supportingly engage a rear wall or the rear window of rooftop 17. In FIGS. 1 and 2, cradles 36 are illustrated in a horizontal position. However, it may be preferred that cradles 36 are in a vertical or generally vertical orientation on support panel 14 and appropriately contoured to fit against the rear wall or window of a specific vehicle rooftop. In the preferred embodiment, cradles 36 are coated or covered to avoid potentially scratching or marring rooftop 17 when it is placed on storage cart 10. Suitable pads are vinyl or plastic covered plastic or plastic form or fibers. Cradles 36 could also be coated with felt flocking material or any soft plastic or rubberized synthetic in order to achieve the same effect. For example, felt flocking may be preferred where there may be a chemical reaction between the vinyl coating and the paint on rooftop 17. Vinyl may be preferred because of its durability. Cradles 36 provide a wider distribution of the weight of rooftop 17 over a greater surface area than existing carts. Therefore, cradles 36 provide additional padding so that a rooftop 17 can be stored on storage cart 10 for a relatively long time without the risk of the rooftop's own weight bearing down on the supporting structure and denting or marring the rooftop.

Support member 16 is preferably H-shaped, as shown in FIGS. 1 and 3. In the preferred embodiment, support member 16 includes cross-leg 40 and vertical legs 42. The axially opposite ends of vertical legs 42 abutingly engage notches 24 and 34 on base 12 and support panel 14, respectively when storage cart 10 is in the upright supporting position. Alternatively, support member 16 could be Y-shaped or a solid planar panel. In the disclosed embodiment, support panel 16 is H-shaped for additional stability and for convenient storing when storage cart 10 is placed in a folded storable position.

Support panels 14 and 16 are generally planar and illustrated as generally flat and straight when viewed from this side. However, it is possible that alternative embodiments would include panels having a curved or angular cross-section.

FIG. 3 illustrates a storage cart 10, prior to assembly. Storage cart 10 is disassembled in FIG. 3 for illustrative purposes only. It should be emphasized that storage cart 10 need not be disassembled in the manner shown in FIG. 3 for easy storage. The disassembled unit is shown to illustrate the features of the base 12, support panel 14 and panel 16. When rooftop 17 is removed from storage cart 10 and replaced on the vehicle, storage cart 10 can be easily and conveniently placed in a folded storable position for storage out of the user's way. The manner of folding and storing storage cart 10 can be described generally as follows.

Assuming the cart is initially in the upright supporting position, as shown in FIG. 1, support panel 14 is supported by panel 16 and hingedly connected to base 12 by hinges 30, such that the distal edge on support panel 14 can be moved accurately away from base 12. Support panel 16 then no longer engages abutment or notch 34. Support panel 16 can then be removed from the position illustrated in FIG. 2 and neatly tucked within recess 26, generally as shown by direction arrow 43 in FIG. 3. The distal edge of support panel 14 then is moved acruately down toward base 12, such that base 12, support panel 14 and support 16 are all essentially flat and parallel. In this position, latching mechanism 44 can be used to maintain storage cart 10 in the folded storable position. In FIG. 3, latching mechanism 44 is a wing nut that can be appropriately threaded through hole 45 in support panel 14 and hole 46 in base 12. In the preferred embodiment, base 12 further includes mounting hole 48 for conveniently storing the folded storage cart 10 upon a wall.

FIG. 4 illustrates how the folded storage cart 10 can be hung upon a wall 50 by inserting a support peg or hook 52 through mounting hole 48, such that storage rack 10 is vertically hanging on wall 50. Latching mechanism 44 maintains the distal edge of support panel 14 and base 12, thereby securing support panel 16 within recess 26, such that support panel 16 is neatly and securely nested between support panel 14 and base 12. Therefore, the possibility for losing pieces of storage cart 10 is effectively eliminated.

The only assembly or disassembly associated with placing the inventive foldable storage cart 10 into either the upright support position illustrated in FIGS. 1 and 2 or the folded storable position illustrated in FIG. 4 includes simply arcuately moving the distal edge of support panel 14 relative to base 12 and properly positioning support panel 16, depending on the position desired. Therefore, this invention provides a secure means of storing a vehicle rooftop that is easily assembled or disassembled such that storage cart 10 can be placed in an upright support position or a folded storable position depending on the application required.

FIG. 5 illustrates an alternative embodiment of the support panel 14 shown in FIGS. 1-4. The support panel 114 shown in FIG. 5 includes an upper horizontal cradle support pad 136 and a pair of lower spaced vertically oriented cradle pads 137. The three pads fully support an automotive hardtop in a generally vertical orientation as shown in FIG. 1, but the pads 137 require less material than the pad 36. Thus the panel 114 is less expensive to manufacture. Further, the combination of the generally vertically oriented pads 137 and the horizontal pad 136 accommodate and support various automotive hardtop designs.

As will now be understood, the hardtop roof storage cart of this invention will protect the rooftop during moving and storage because the bottom or base panel 12 protects the rooftop from damage from objects below and the inclined panel 14 supports and protects the rooftop from the back. Further, the cradle support pads 36 in FIGS. 1 to 4 and 136, 137 in FIG. 5 support the hardtop without damage or scratching. The panels are preferably formed of a lightweight sturdy plastic, such as ABS resin. A suitable thickness for such panels ranges from ⅛ to 3/16 inches, wherein the base panel has the greater thickness. The storage cart may be easily folded substantially flat for storage when not in use. Further, the roof storage cart of this invention is relatively inexpensive. Thus, the foldable automotive hardtop roof storage cart of this invention solves the problems associated with the prior cart assemblies, as described above.

The preceding description is exemplary rather than limiting in nature. A preferred embodiment of this invention has been disclosed to enable one skilled in the art to practice this invention. Modifications are possible that would not depart from the spirit or purview of this invention, which is limited only by the appended claims. For example, a Y-shaped member (or modified "H") may be substituted for the H-support member 16, wherein the base of the "Y" rests on the base panel 12 and the arms engage the sockets 34, as shown in FIG. 1. Base panel 12 would have a corresponding "Y" recess storage area for the "Y"-support member and the perimeter shape of base panel 12 contoured to match. Further, as described above, the support cradles 36 may be formed integrally with the upright panel 14 and the surfaces may be flocked.

What is claimed is:

1. A foldable storage rack for storing a removable vehicle rooftop while the rooftop is not on the vehicle, comprising:
   a generally planar base;
   a first abutment disposed on said base; and
   first and second generally planar support panels, said first panel being hingedly connected to said base adjacent a lower edge on said first panel such that an inward surface on said first panel faces said base, said second panel engaging said first abutment adjacent a lower edge on said second panel, said lower panel edges being generally parallel, said panels non-hingedly engaging each other adjacent a distal panel edge on one of said panels, said base and said panels forming a triangle in a upright supporting position to support a vehicle rooftop, said storage rack being foldable by moving said second panel and folding said first panel about said hinged connection to lie generally flat on said planar base.

2. The foldable storage rack of claim 1 wherein said first panel has a second abutment disposed on said inward surface, said second abutment being spaced from a distal edge on said first panel.

3. The foldable storage rack of claim 2 wherein said second panel engages said first panel adjacent said second abutment and adjacent a distal panel edge on said second panel.

4. The foldable storage rack of claim 3 wherein said base includes a load support portion disposed on said base adjacent said hinged panel lower edge, said load support portion being adapted to supportingly receive a lower rear portion of a rooftop that is placed on said storage rack.

5. The foldable storage rack of claim 4 further comprising a third abutment disposed on said base adjacent said load support portion such that said load support portion is disposed between said third abutment and said hinged panel lower edge, said third abutment preventing a rooftop from moving laterally relative to said base when a rooftop is placed on said storage rack.

6. The foldable storage rack of claim 4 further comprising a plurality of ribs disposed on said load support portion, said ribs being generally perpendicular to said hinged panel lower edge and adapted to receive and generally conform to a lower rear portion of a rooftop.

7. The foldable storage rack of claim 1 wherein said first panel has a second abutment disposed on an inward surface of said first panel that faces said base, said first abutment being spaced from a distal edge on said second panel.

8. The foldable storage rack of claim 7 wherein said first panel engages said second panel adjacent said second abutment and adjacent a distal panel edge on said first panel.

9. The foldable storage rack of claim 8 wherein said base includes a load support portion disposed on said base adjacent said first abutment, said load support portion being adapted to supportingly receive a lower rear portion of a rooftop that is placed on said storage rack.

10. The foldable storage rack of claim 9 further comprising a third abutment disposed on said base adjacent said load support portion such that said load support portion is disposed between said third abutment and said first abutment, said third abutment preventing a rooftop from moving laterally relative to said base when a rooftop is placed on said storage rack.

11. The foldable storage rack of claim 9 further comprising a plurality of ribs disposed on said load support portion, said ribs being generally perpendicular to said second panel lower edge and adapted to receive and generally conform to a lower rear portion of a rooftop.

12. The foldable storage rack of claim 1, wherein said first planar support member includes a generally horizontal project resilient first support pad adjacent and support edge of said first planar support member and a projecting resilient second support pad adjacent a lower edge thereof, said support pads projecting from the plan of said first planar support member to engage and support a rooftop supported on said base.

13. The foldable storage rack of claim 12, wherein said second support pad is oriented generally horizontally adjacent said lower edge of said of first planar support member.

14. The foldable storage rack of claim 12, wherein said second support pad comprising a pair of generally vertically oriented spaced projecting resilient support pads adding on lower end adjacent said lower edge of said first support member and an upper edge space from said first support pad.

15. A foldable storage rack for storing a removable vehicle rooftop while the rooftop is not on the vehicle, comprising:
   a base;
   a plurality of wheels attached to said base;
   a first abutment disposed on said base;
   a first generally planar support member hingedly connected to said base adjacent a lower edge on said first support member such that an inward surface on said first support member faced said base; and
   a second support member having first and second axial ends, said second support member engaging said first abutment adjacent said first axial end, said second support member non-hingedly engaging said first support member adjacent said second axial end, said base and said support members forming a triangle in an upright support position to support a rooftop.

16. The foldable storage rack of claim 15 wherein said first support member has a second abutment disposed on said inward surface, said second abutment being spaced from a distal edge on said first support member.

17. The foldable storage rack of claim 16 wherein said second support member engages said first support member adjacent said second abutment and adjacent said second axial end on said second support member.

18. The foldable storage rack of claim 17 wherein said base includes a load support portion disposed on said base adjacent said hinged lower first support member edge, said load support portion being adapted to supportingly receive a lower rear portion of a rooftop that is placed on said storage rack.

19. The foldable storage rack of claim 18 further comprising a third abutment disposed on said base adjacent said load support portion such that said load support portion is disposed between said third abutment and said hinged lower first support member edge, said third abutment preventing a rooftop from moving laterally relative to said based when a rooftop is placed on said storage rack.

20. The foldable storage rack of claim 18 further comprising a plurality of ribs disposed on said load support portion, said ribs being generally perpendicular to said lower first support member edge and aligned and shaped to generally conform to a lower rear portions of a rooftop.

21. A foldable storage rack for storing a removable vehicle rooftop while the rooftop is not on the vehicle comprising:
   a generally planar base panel having a load support portion adjacent a from base edge, said load support portion being adapted to supportingly receive a lower portion or a rooftop that is placed on said storage rack;
   a first abutment on said base adjacent said load support portion and proximate said from base edge, said first abutment preventing a rooftop from moving laterally relative to said base when a rooftop is placed on said storage rack;
   a plurality of wheels attached to said base;
   a first generally planar support panel hingedly connected to said base panel adjacent a lower edge on said first panel and adjacent said load support portion, such that said load support portion is disposed between said first abutment and said first panel lower edge and such that an inward surface on said first panel faces said base, said lower first panel edge being parallel to said from base edge;
   a plurality of projecting resilient support pads attached to second projecting from said planar support panel and;
   a second generally planar support panel that engages said base panel adjacent a lower edge on said second panel such that said lower panel edge is generally parallel to said first panel lower edge, said second panel engaging said first panel adjacent a distal panel edge on one of said panels, said base and said panels forming a triangle in an upright support position to support a rooftop second said storage rack being foldable to a generally flat storage position by moving said second support panel second folding said first panel about said hinged connection to said base panel to lie generally flat on said base panel.

22. The foldable storage rack of claim 23 wherein said first panel includes second abutment disposed on said inward surface and spaced from a distal edge on said first panel and said second panel engages said first panel adjacent said second abutment and adjacent a distal edge on said second panel.

23. The foldable storage rack of claim 21 further comprising two support pads attached to an outward surface on said first support panel, including a upper generally horizontal support pad adjacent an upper edge second a lower support panel, said panel supporting engaging a portion of a rooftop when a rooftop is placed on said storage rack.

24. The foldable storage rack of claim 23 wherein said pads are vinyl coated.

25. The foldable storage rack of claim 21 wherein said second support panel is generally H-shaped having three legs, a cross-leg being horizontally disposed between and connected to two parallel vertical legs, said cross-leg being generally parallel to said base when said second support panel is engaging said second abutment and said first support panel.

26. The foldable storage rack of claim 25 wherein said second abutment comprises a notch formed on said base, said notch being adapted to engagingly receive a lower edge on each said vertical leg of said second support panel.

27. The foldable storage rack of claim 21 further comprising a recess formed on said base that is adapted to receive said second support panel when said storage rack is in a folded non-supporting position.

* * * * *